(12) United States Patent
Natori

(10) Patent No.: US 8,611,599 B2
(45) Date of Patent: Dec. 17, 2013

(54) INFORMATION PROCESSING APPARATUS, INFORMATION PROCESSING METHOD, AND STORAGE MEDIUM

(75) Inventor: Ryoko Natori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 13/207,239

(22) Filed: Aug. 10, 2011

(65) Prior Publication Data

US 2012/0051591 A1    Mar. 1, 2012

(30) Foreign Application Priority Data

Aug. 24, 2010 (JP) ................................. 2010-187641

(51) Int. Cl.
*G06K 9/00* (2006.01)

(52) U.S. Cl.
USPC .......................................................... 382/103

(58) Field of Classification Search
USPC .................. 382/103, 115, 118, 218, 224, 305
See application file for complete search history.

(56) References Cited

U.S. PATENT DOCUMENTS 7,242,810 B2 *  7/2007  Chang ........................... 382/227
7,266,254 B2 *  9/2007  Ishikawa et al. .............. 382/305
7,623,718 B2 * 11/2009  Endo ............................. 382/232

OTHER PUBLICATIONS

P. Viola, et al., "Robust Real-time Object Detection", Second International Workshop on Statistical and Computational Theories of Vision, Jul. 13, 2001.

* cited by examiner

*Primary Examiner* — Daniel Mariam
(74) *Attorney, Agent, or Firm* — Fitzpatrick, Cella, Harper & Scinto

(57) ABSTRACT

An information processing apparatus performs verification processing between an input image and a parameter while referring to the parameter having data to identify an object in the input image. The information processing apparatus includes a calculation unit adapted to perform verification processing to identify the object from the input image by referring to a fixed parameter or variable parameter in one of the series-connected processing step group and one processing step group out of the plurality of processing step groups, a determination unit adapted to determine, based on the calculation result of the calculation unit, whether the calculation unit executes the verification processing next in the series-connected processing step group or one processing step group out of the plurality of processing step groups connected via the branches, and a selection unit adapted to select the fixed parameter or variable parameter.

6 Claims, 13 Drawing Sheets

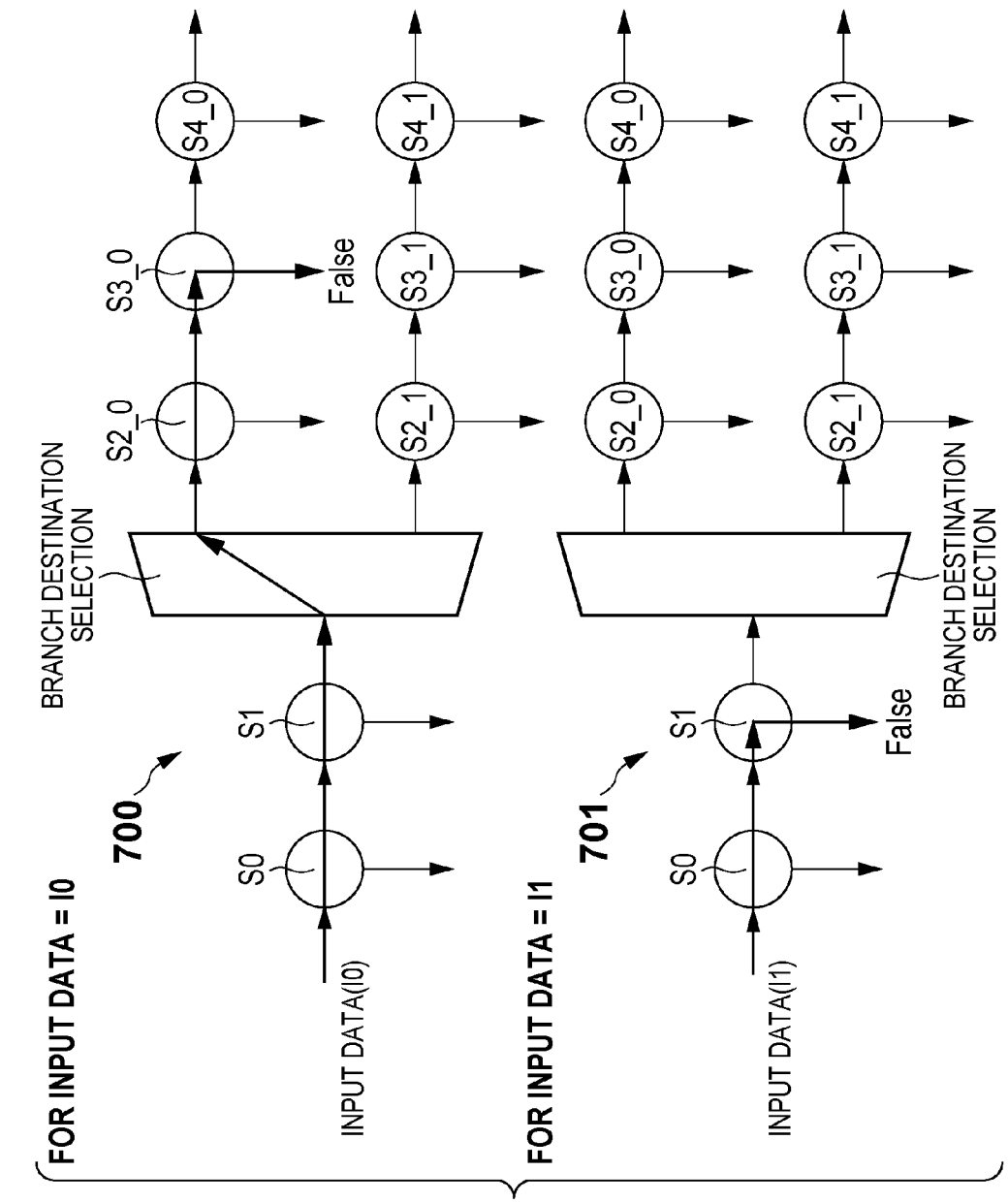

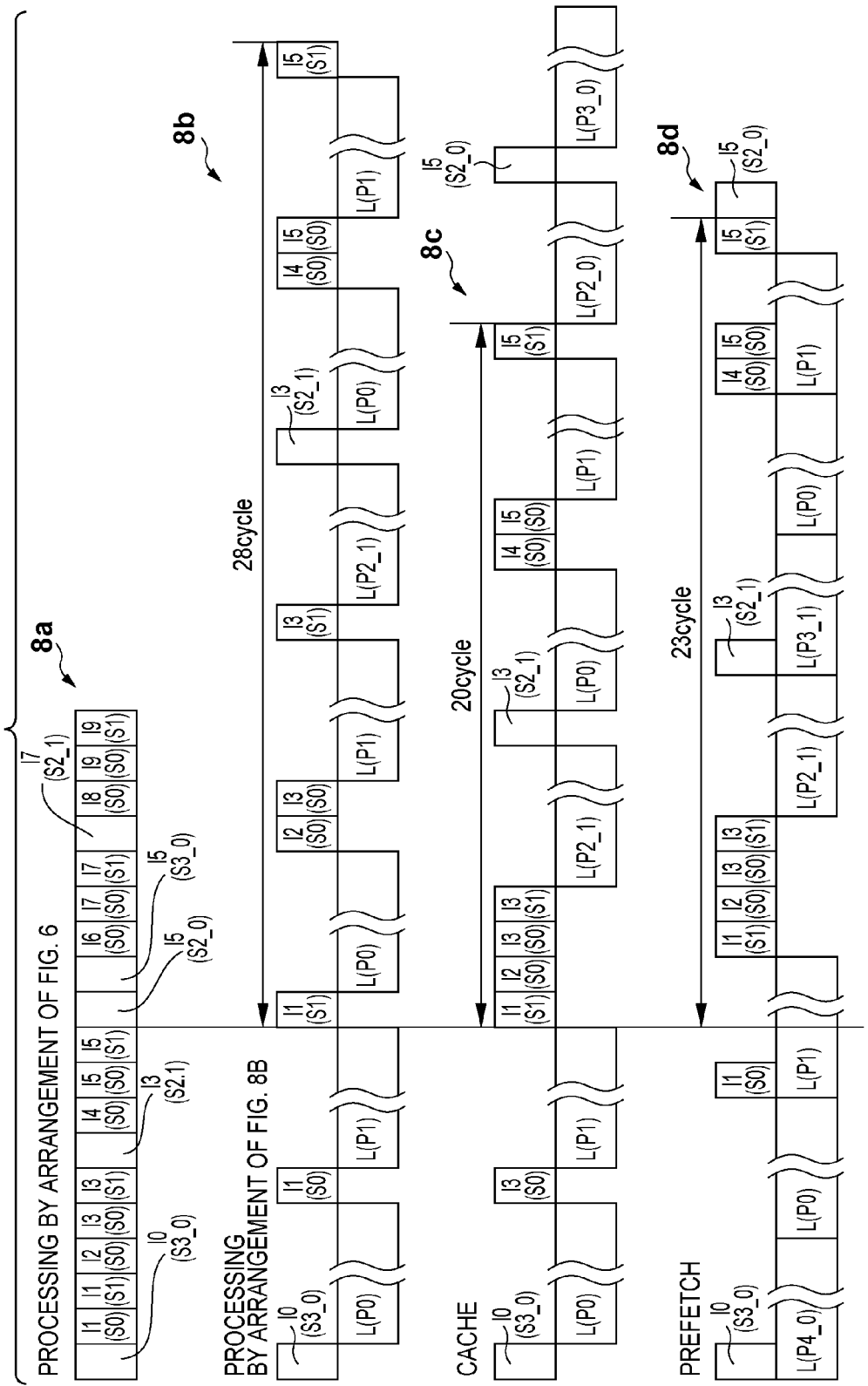

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, information processing method, and storage medium.

2. Description of the Related Art

Conventionally, a technique for detecting a specific object such as a person or face in an input image (to be referred to as input data) and performing processing suited to the detected object has been proposed for digital cameras and printers. An example of detecting a specific object is face detection processing of detecting a human face to perform skin color correction for the face.

Various methods have been proposed for the face detection processing. Examples are NPL1 (P. Viola and M. Jones, "Robust Real-time Object Detection", SECOND INTERNATIONAL WORKSHOP ON STATISTICAL AND COMPUTATIONAL THEORIES OF VISION, Jul. 13, 2001: to be referred to as "Viola & Jones method") using a plurality of discriminators, and methods using symmetrical features of the human face, template matching, neural network, and the like. The method using a plurality of discriminators can implement many discriminators by changing dictionary data (parameters) of one or several discrimination circuits. At this time, a cache method and prefetch method are used as techniques for rewriting parameters during processing, as needed, to speed up processing while suppressing the circuit scale of an internal memory configured to store parameters.

The following problems arise in the cache method and prefetch method serving as techniques for speeding up processing while suppressing the circuit scale of an internal memory. The cache method erases parameters sequentially from the oldest one. If processing for input data advances to (for example, (m+1)th) identification processing larger than the number (for example, m) of parameters storable in a parameter storage unit, and then the result of the identification processing becomes False, all parameters always need to be reloaded because the first parameter is already deleted. The cache effect is poor for a branch structure.

The prefetch method predicts the next necessary parameter, and loads a parameter i+1 for use in identification processing i+1 during identification processing i using a parameter i. However, if the result of identification processing i becomes False, the prediction fails and the loaded parameter i+1 becomes invalid. When the prefetch method is applied to a branch structure, all the parameters of a plurality of branch destination candidates may be prefetched, or after determining a branch destination, a parameter may be loaded without prefetch. In the former case, only one of the parameters is used actually, and invalid parameter loading rises. In the latter case, processing stops during parameter loading.

SUMMARY OF THE INVENTION

The present invention provides an information processing technique capable of speeding up processing while suppressing the circuit scale of an internal memory.

According to one aspect of the present invention, there is provided an information processing apparatus which performs, at multiple stages by a series-connected processing step group and one processing step group out of a plurality of processing step groups connected to a final step of the processing step group via branches, verification processing between an input image and a parameter while referring to the parameter having data to identify an object in the input image, comprising: a first storage unit adapted to store a predetermined fixed parameter; a second storage unit adapted to store a variable parameter different from the fixed parameter to be able to rewrite the variable parameter; a calculation unit adapted to perform verification processing to identify the object from the input image by referring to one of the fixed parameter and the variable parameter in one of the series-connected processing step group and one processing step group out of the plurality of processing step groups; a determination unit adapted to determine, based on a calculation result of the calculation unit, whether the calculation unit executes the verification processing next in the series-connected processing step group or one processing step group out of the plurality of processing step groups connected via the branches; and a selection unit adapted to select, based on a determination result of the determination unit and the calculation result of the calculation unit, one of the fixed parameter and the variable parameter to be referred to next by the calculation unit.

The present invention can speed up processing while suppressing the circuit scale of an internal memory.

Further features of the present invention will become apparent from the following description of exemplary embodiments (with reference to the attached drawings).

BRIEF DESCRIPTION OF THE DRAWINGS

FIG. 7B is a view exemplifying a branch structure which simplifies the branch structure in FIG. 7A;

FIGS. 8A and 8B are exemplary views for explaining the data processing time in the branch structure;

DESCRIPTION OF THE EMBODIMENTS (Outline of Processing of Identifying Object from Input Image)

Figure 2:
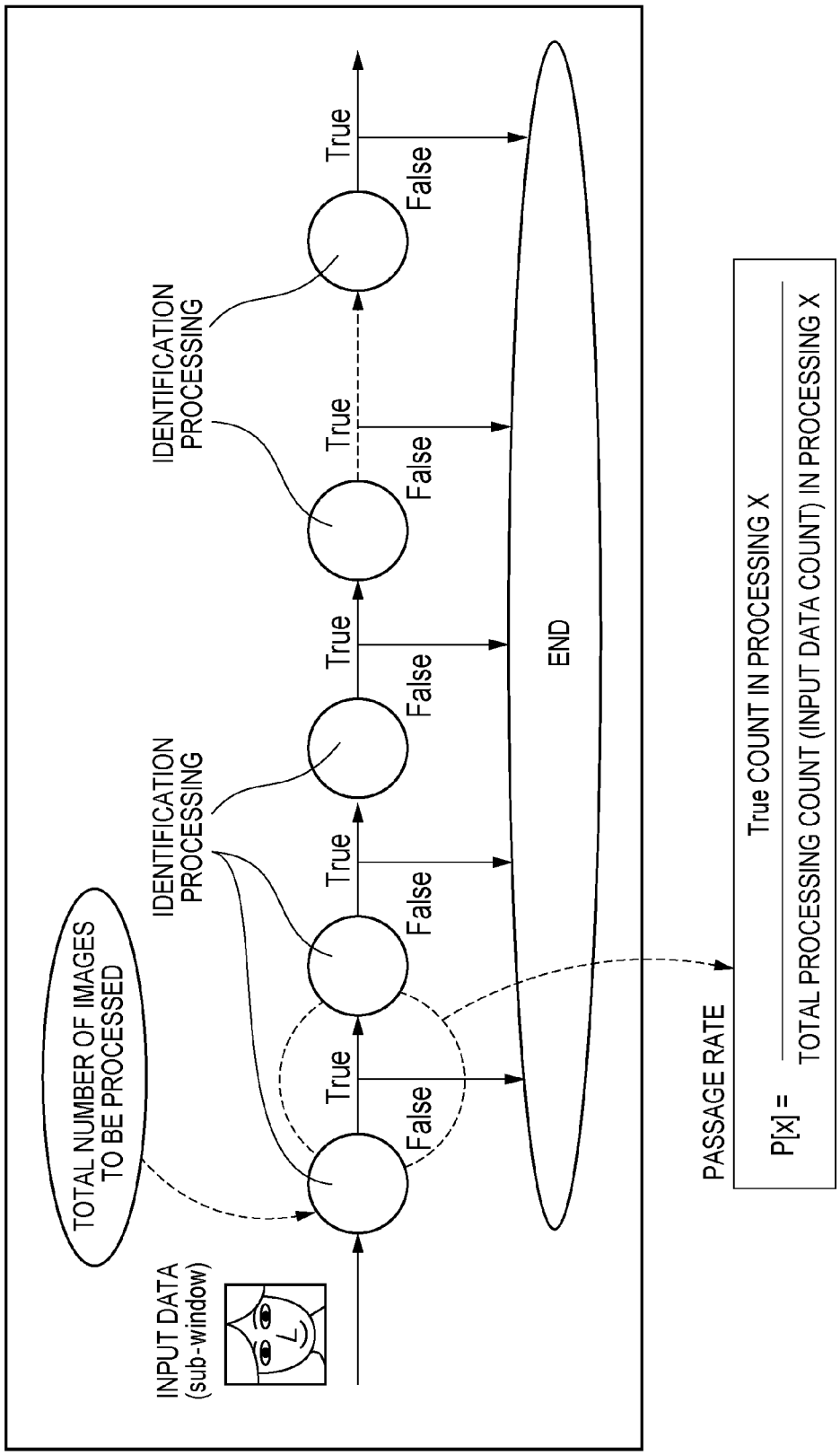
FIG. 2 is a view for explaining recognition processing in face detection processing.

The Viola & Jones method will be exemplified as face detection processing. The Viola & Jones method executes identification processing based on AdaBoost learning results. As shown in FIG. 2, this identification processing is cascade processing in which if True is output as the result of identification by a given discriminator, subsequent discriminator performs identification, and if False is output, identification processing ends without performing identification by the subsequent discriminator.

In face recognition, many face data are input and learnt so that the face recognition rate or recognition error rate reaches a predetermined level. Based on them, a plurality of dictionary data are generated for identification processing. The identification processing is pattern matching processing, and the face detection processing is a series of pattern matching processes using the dictionary data. The dictionary data are data such as a feature pattern necessary for pattern matching processing, and a threshold used as a criterion for True/False determination (the dictionary data will be called parameters).

Figure 3:
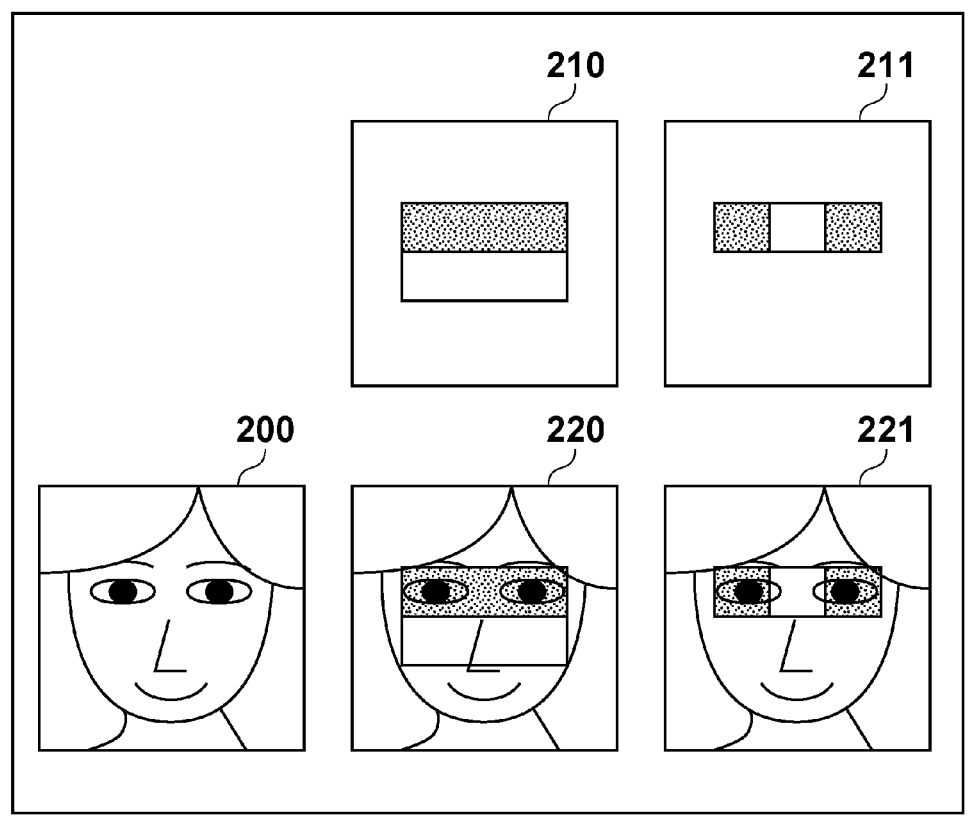
FIG. 3 is a view exemplifying learning results in face recognition.

FIG. 3 is a view exemplifying learning results in face recognition. In FIG. 3, reference numeral 200 denotes input data. A feature pattern 210 serves as part of a parameter, and represents a feature in which a small rectangular part of both eyes is more blackish than a part (cheek part) under both eyes. A feature pattern 211 also represents a feature in which eye parts are blackish at the part of both eyes and a part between both eyes is more whitish than the eye part. Reference numerals 220 and 221 denote states in which pattern matching processing is performed by actually collating the feature patterns 210 and 211 with the input data 200.

Figure 4:
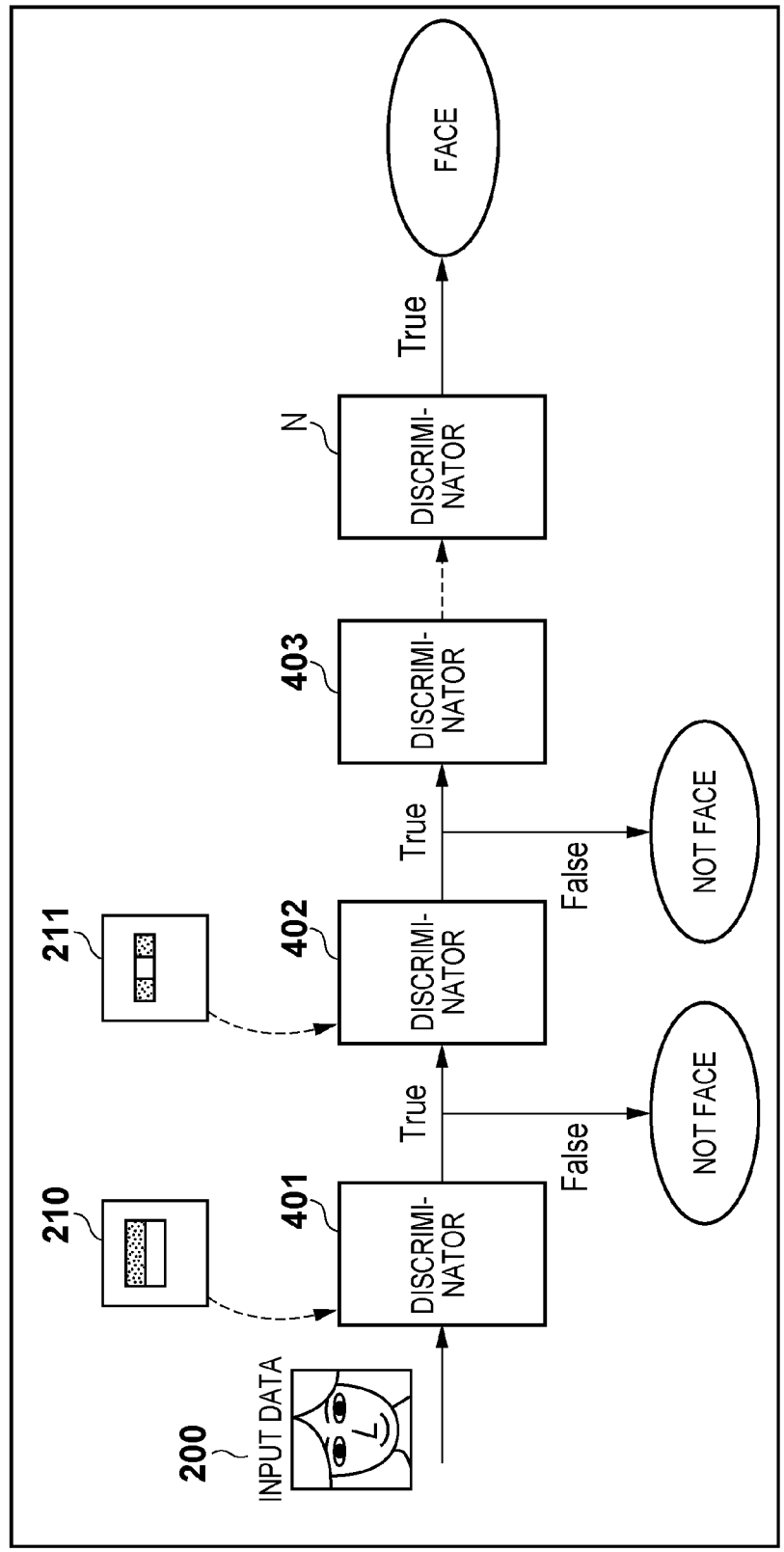
FIG. 4 is a block diagram showing a conceptual arrangement when the Viola & Jones method is implemented as hardware.

FIG. 4 is a block diagram showing a conceptual arrangement when the Viola & Jones method described with reference to FIGS. 2 and 3 is implemented as hardware. Referring to FIG. 4, a discriminator 401 saves the feature pattern 210 serving a parameter for identification processing 0. The discriminator 401 also saves threshold 0 used to determine which of True and False is the result of identification processing 0. The feature pattern 210 and threshold 0 necessary for identification processing 0 will be called parameter 0 (to be referred to as "P0").

If the result of identification processing using P0 is True, a next discriminator 402 series-connected to the discriminator 401 performs identification processing 1 for the input data 200, similar to the discriminator 401. Identification processing 1 uses the feature pattern 211 serving as a parameter for identification processing 1, and threshold 1 to determine which of True and False is the result of identification processing 1. The discriminator 402 saves the feature pattern 211 and threshold 1 as parameter P1 (to be referred to as "P1") for the discriminator 402. Identification processes 0 and 1 use different parameters. Further, identification processes using a discriminator 403, . . . , discriminator N are executed. If the identification result of the discriminator N is True, the image data is identified as a face. If the identification result of the discriminator using one of P0, P1, . . . is False, the image data is identified not as a face, and the processing ends.

Figure 5:
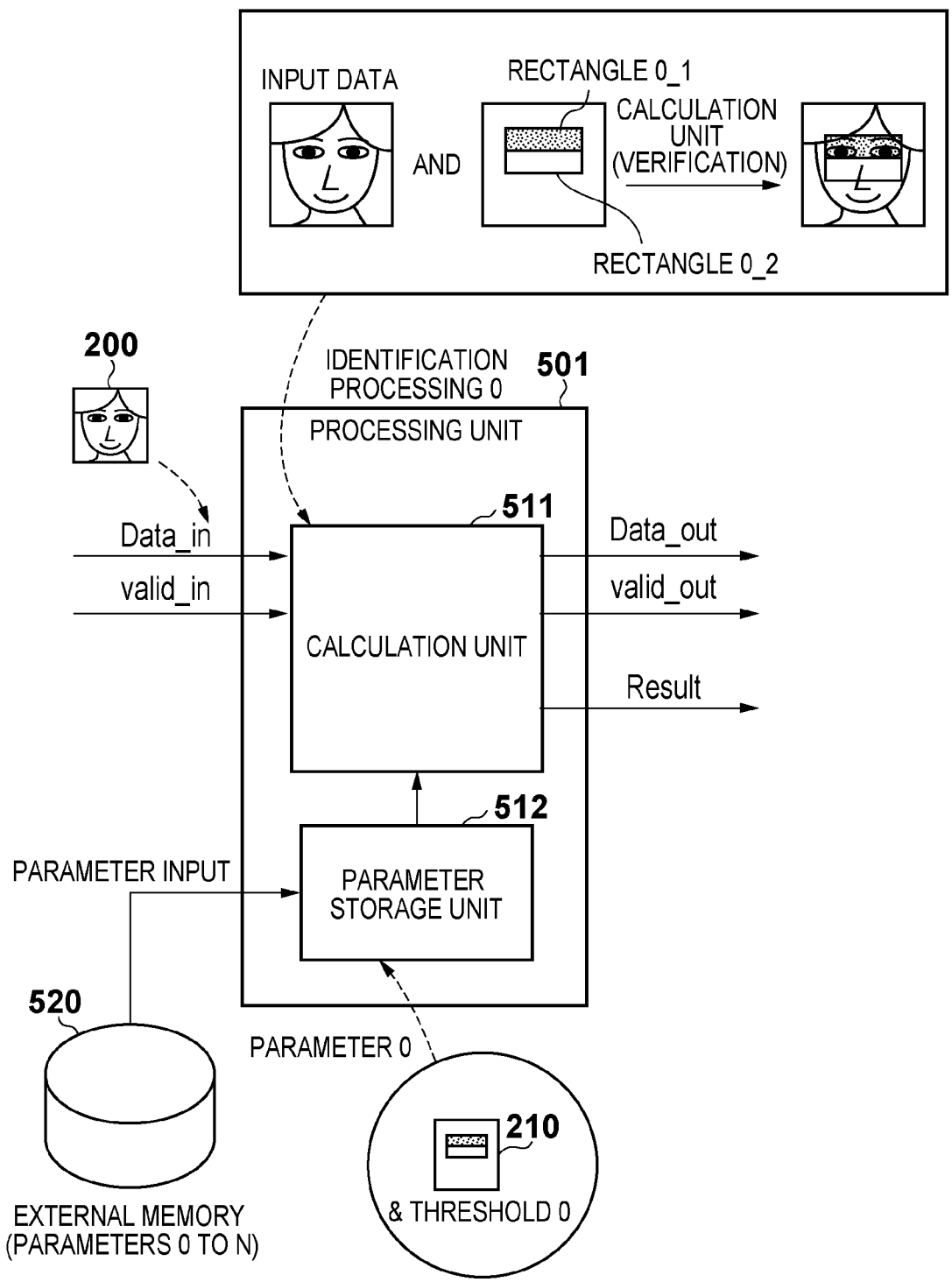
FIG. 5 is a block diagram exemplifying a more detailed circuit arrangement of the conceptual hardware arrangement shown in FIG. 4.

FIG. 5 is a block diagram exemplifying a more detailed circuit arrangement of the conceptual hardware arrangement shown in FIG. 4. A processing unit 511 and parameter storage unit 512. The parameter storage unit 512 is an internal memory which stores parameters necessary for identification processing. As described above, identification processes 0 and 1 are different in only parameters. A parameter necessary for processing is loaded into the parameter storage unit 512 out of parameters 0 to N (hereinafter, P0 to PN) stored in an external memory 520.

More specifically, when performing identification processing 0, P0 is loaded from the external memory 520 into the parameter storage unit 512. The calculation unit 511 can perform identification processing 0 by referring to P0 stored in the parameter storage unit 512. Similarly, when performing identification processing 1, P1 is loaded, and the calculation unit 511 executes calculation by referring to P1 stored in the parameter storage unit 512. This method enables identification processes 0 to N.

Identification processing will be explained in more detail. For example, for the discriminator 401 which performs identification processing 0 shown in FIG. 4, the calculation unit 511 loads P0 into the parameter storage unit 512. The calculation unit 511 refers to P0 loaded into the parameter storage unit 512, and performs pattern matching with the input data 200 using the feature pattern 210 serving as part of P0. Identification processing 0 calculates the sum of the pixel value (luminance) of the input data that corresponds to the position of rectangle 0_1 serving as the pattern matching range of the feature pattern 210 and the sum of the pixel value (luminance) of the input data that corresponds to the position of rectangle 0_2. Then, identification processing 0 calculate a luminance difference between the sum of rectangle 0_1 and the sum of rectangle 0_2. If the calculated luminance difference exceeds threshold 0, it is determined that the input data 200 matches a feature represented by the feature pattern 210, and the result "face" (Result=True) is output.

The feature pattern 210 contained in P0 indicates a pixel position to be verified in image data. The calculation unit 511 for performing pattern matching processing calculates the sum of pixel values at designated pixel positions in a rectangle, and further calculates the difference between sums in respective rectangles. The calculation unit 511 compares the difference with threshold 0, and outputs the result of identification processing 0.

More specifically, the calculation unit 511 can be implemented to perform similar calculation independent of identification processing in accordance with pixel positions and thresholds designated by parameters. The parameter storage unit 512 stores parameters by the number of stages necessary for identification processes or by all stages. Switching the parameter in accordance with the processing stage can implement identification processes at all stages.

Recently, recognition processing typified by the Viola & Jones method needs to be installed in a digital camera or the like to implement a function of, for example, detecting a face and focusing on it. Demand is growing for executing recognition processing in real time (quickly). Meanwhile, digital household appliances such as a digital camera are very cost-sensitive. The need is also high for implementing the recognition processing function at a cost as low as possible, that is, minimizing the circuit scale.

The example shown in FIG. 5 is an implementation example which suppresses the circuit scale by sharing the calculation unit 511 between all identification processes. In this case, the number of identification processing parameters stored in the parameter storage unit 512 is a dominant factor of the circuit scale. Even the processing speed greatly changes depending on the number of stored identification processing parameters. In general, the access speed greatly differs between the external memory 520 and the internal memory (parameter storage unit 512). The external memory is generally formed from a DRAM or the like, and its access time (parameter loading time) is on the order of several ten nsec to hundred and several ten nsec. To the contrary, the access time of the internal memory is several nsec. These access times are different by 10 to 100 times. Therefore, when very high-speed processing is required, it is popular to store parameters for all identification processes in the high-speed accessible internal memory (parameter storage unit 512), and perform respective identification processes without replacing the parameter.

Figure 6:
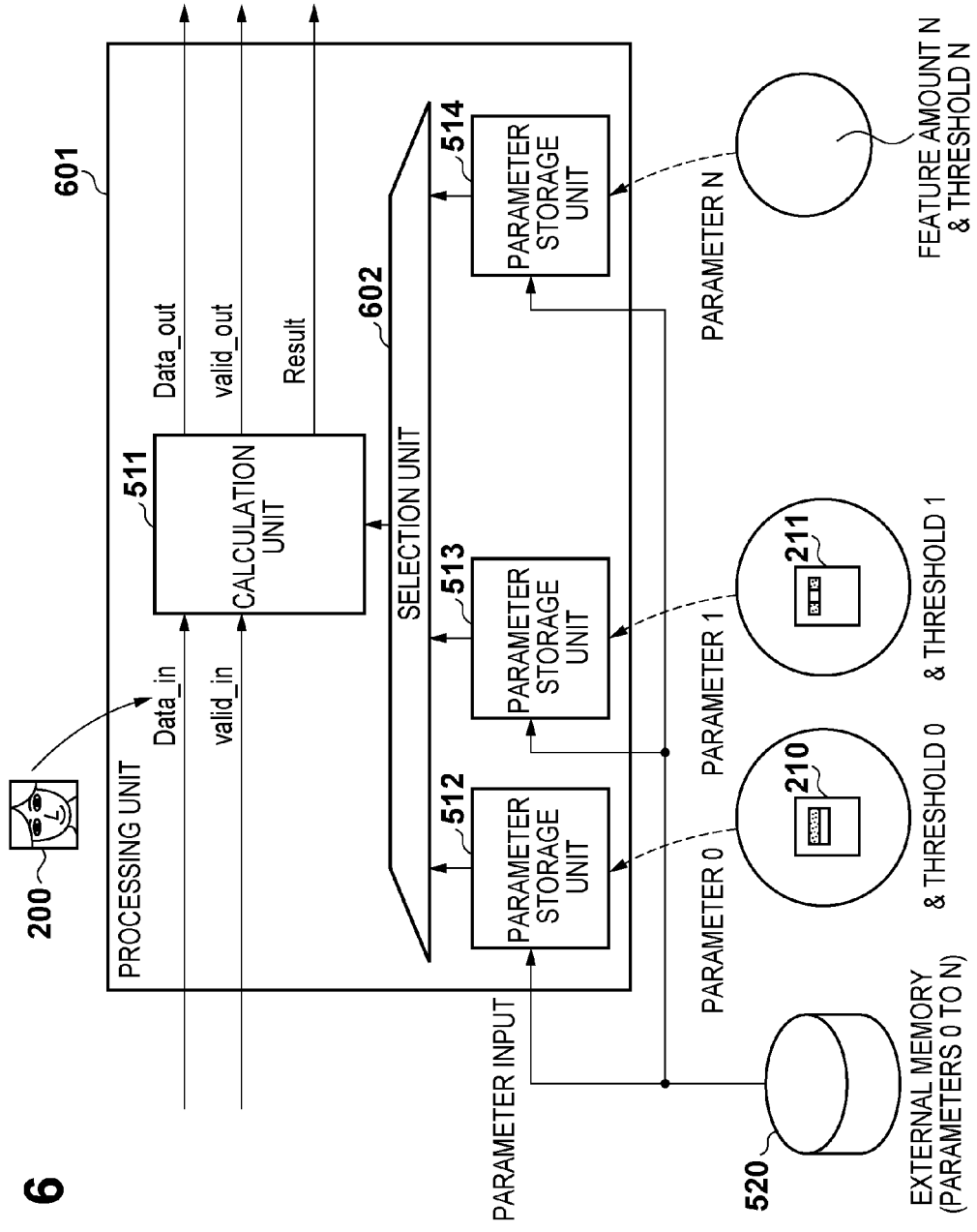
FIG. 6 is a block diagram for explaining the arrangement of a processing unit.

The arrangement of the processing unit for this method will be explained in detail with reference to FIG. 6. FIG. 6 is a block diagram for explaining a method of implementing pattern matching processing by switching processing for each identification processing. Since a processing unit 601 for performing pattern matching processing is independent of identification processing, only one calculation unit 511 is mounted, similar to FIG. 5. The parameter storage unit 512, and parameter storage units 513 and 514 for storing identification processing-dependent parameters are mounted by the total number of identification processes (N identification processes).

Before the start of identification processing, all parameters are loaded from the external memory 520 into the parameter storage units 512 to 514. When the input data 200 is input, a selection unit 602 sets, in the calculation unit 511, the parameter storage unit 512 which stores P0 (parameter 0), and identification processing 0 starts. If the determination result is True, the selection unit 602 switches to the parameter storage unit 513 which stores the next P1 for the input data 200, enabling subsequent identification processing 1.

In this manner, parameters for all identification processes are stored in the internal memories (parameter storage units 512 to 514) so that a parameter necessary for each identification processing need not be loaded from the external memory 520 which is lower in access speed than the internal memory. High-speed processing becomes possible without overhead in loading.

Figure 7A:
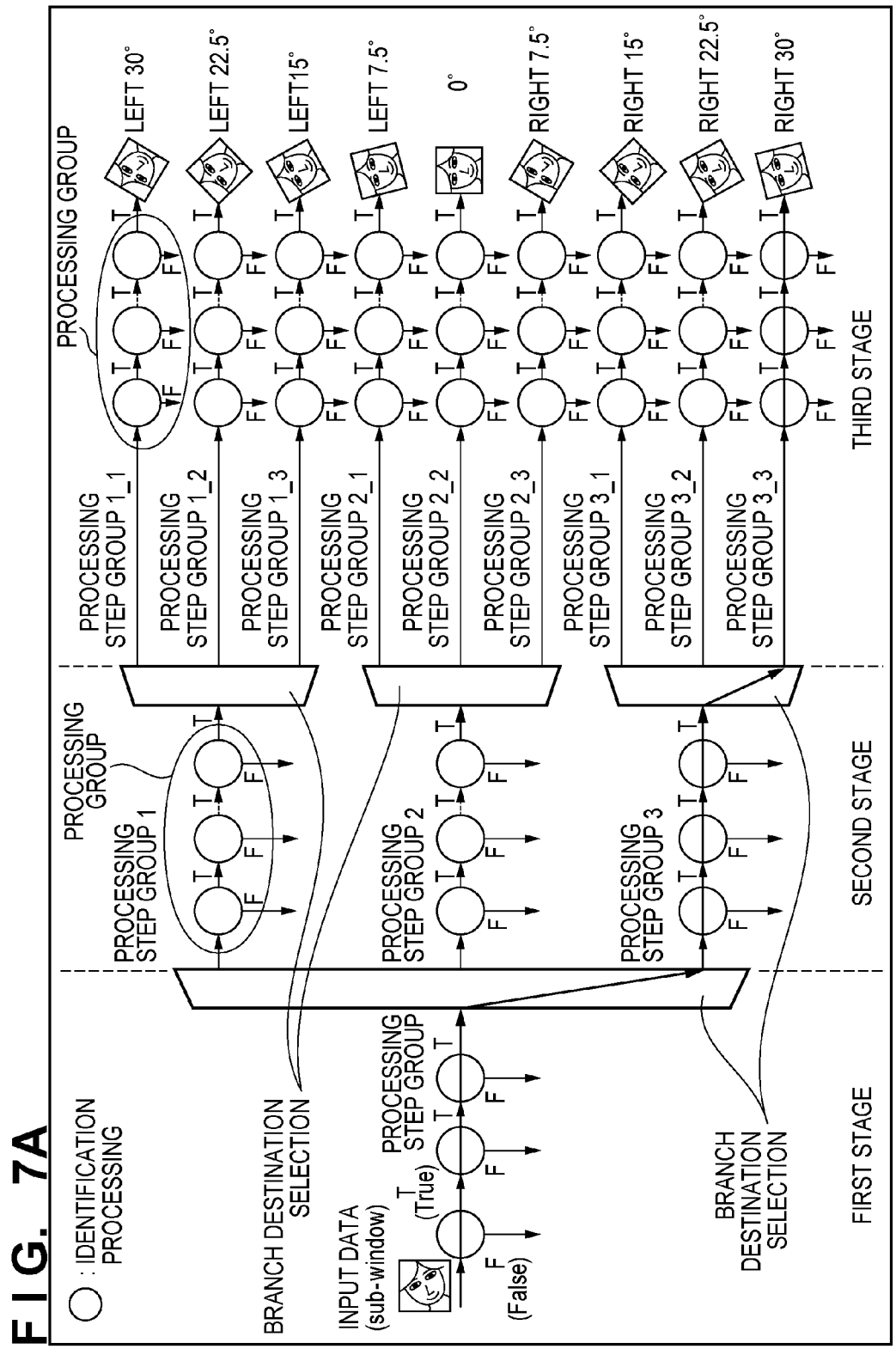
FIG. 7A is a view for explaining the branch structure of identification processing for face detection.

An identification processing branch structure for face detection will be explained with reference to FIG. 7A. As shown in FIG. 7A, as processing proceeds to subsequent stages, it branches more finely, like branches, and thus is called a branch structure. For example, when face recognition coping with up to right/left inclinations of ±30° is installed, identification processing using a parameter learnt in a state containing right/left inclinations of ±30° is placed at the beginning (first stage) to determine whether input data is likely to be a face. Images more specific to angles are leant toward subsequent stages to determine which of right and left inclined images corresponds to the input image.

In FIG. 7A, stages are defined as the first to third stages at respective branches from the leftmost one at the beginning. At the first stage, determination is made for a concept "face". The processing branches from the second stage to derive the final angle. In branch destination determination between the first and second stages, a branch (parameter string) to be selected after the branch is determined. In this example, the parameter string of processing group 3 is selected. Similarly, branch destination determination exists between the second and third stages to determine a more detailed angle. In this example, the parameter string of processing group 3_3 is selected. As a result of selecting the next parameter string in branch destination selection, it is determined that the input data 200 is a face image inclined right at 30°.

As the processing time in the arrangement shown in FIG. 6, the pattern matching processing time will be explained with reference to a branch structure example in FIG. 7B which simplifies the branch structure in FIG. 7A. In branch structure processing of FIG. 7B, processing 700 and processing 701 in FIG. 7B will be described as processing examples of input data 0 (to be referred to as I0) and input data 1 (to be referred to as I1). The processing 700 in FIG. 7B proceeds to identification processing 0 (to be referred to as I0(S0)) and I0(S1) for the input I0. In branch destination selection, it is determined which of parameter strings S2_0 and S2_1 is to be selected.

In the processing 700 of FIG. 7B, the result of I0(S0) is True and I0(S1) is executed. After that, branch destination selection is executed to select S2_0 and execute I0(S2_0). The result is True and I0(S3_0) is executed. The result of I0(S3_0) becomes False, processing I0 ends, and the process shifts to processing for the next input data I1. The processing 701 in FIG. 7B is processing for I1. The result of I1(S0) is True, I1(S1) is executed, and its result becomes False. In response to this, the process shifts to processing for the second next input data I2. In this way, processing is done for input data, and when the result becomes False, shifts to the next input data processing. By executing processing from S0, processing is done for a plurality of input data.

Terms necessary for a description of the processing time will be defined. The passage rate is the probability at which the result of identification processing by the calculation unit 511 becomes True. The identification processing time is a time taken for each identification processing. The parameter loading time is a time taken to load a parameter saved in the external memory into one of the parameter storage units 512 to 514 when switching identification processing.

The following description assumes that the parameter loading time is four times longer than the identification processing time. As described above, the external memory is generally formed from a DRAM or the like, and its access time (parameter loading time) is on the order of several ten nsec to hundred and several ten nsec. To the contrary, the access time of the internal memory is several nsec. This assumption is valid because pattern matching processing based on the Viola & Jones method is very simple calculation. Since even branch destination selection is implemented by a simple selector, assume that it can be executed at the same time as processing before a branch. Loading parameter P0 necessary for identification processing 0 will be called L(P0).

Examples 8a-8d in FIG. 8A each show the execution time after final processing I0(S3_0) in the processing 700 of FIG. 7B in the processing order described in the processing 700 and processing 701 of FIG. 7B. In these examples, the passage rates of all executed identification processes are ½. In the arrangement of FIG. 6, parameters P0 to PN necessary for all identification processes are stored and no parameter loading is executed, as shown in 8a of FIG. 8A. That is, parameter loading does not stop processing. The arrangement shown in FIG. 6 can speed up processing, but requires a large-capacity internal memory to store parameters for all identification processes, raising the cost.

Figure 8B:
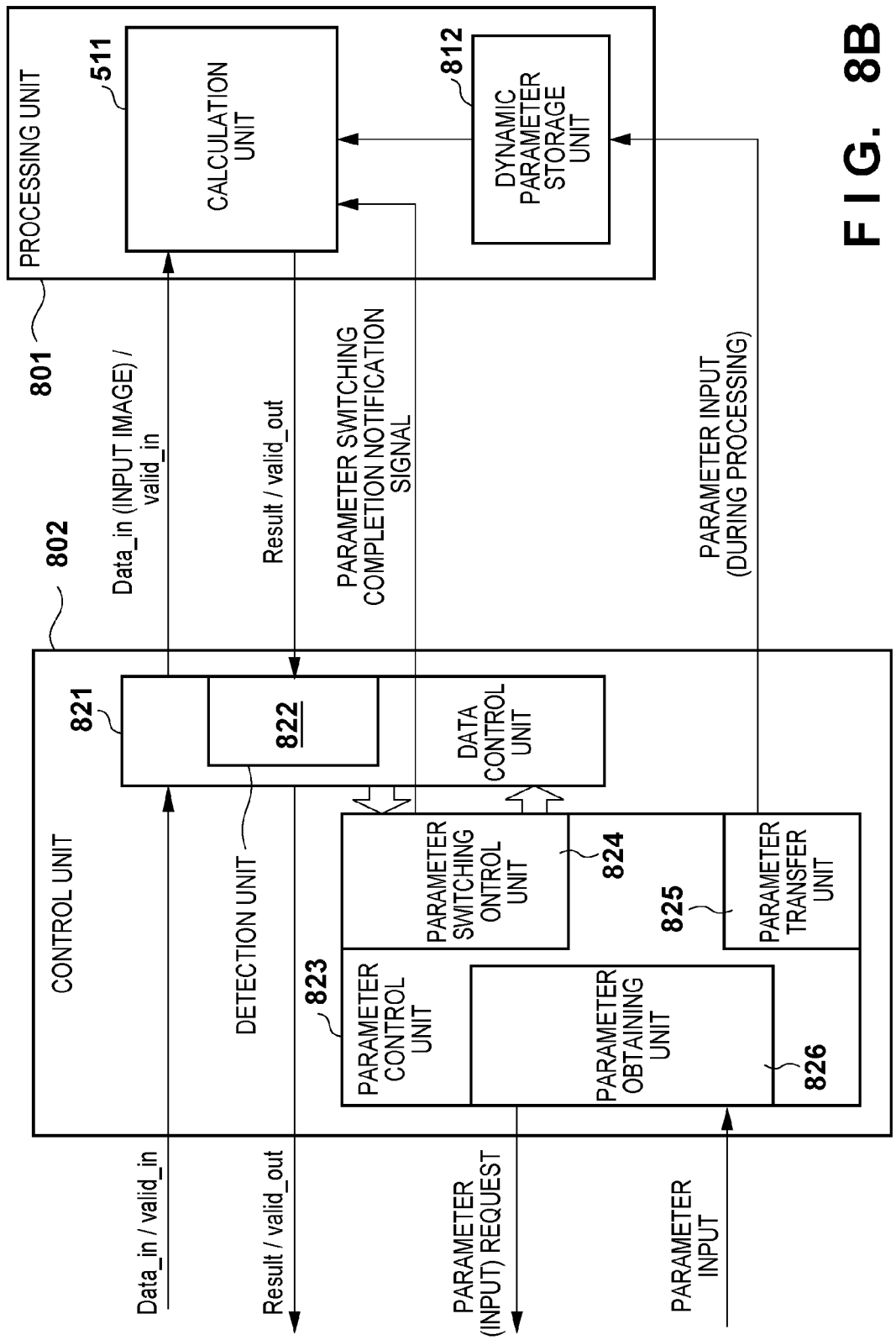

To prevent an increase in the capacities of the parameter storage units 512 to 514, it is popular to load only a parameter necessary for each identification processing from the external memory into the internal memory. In the example of FIG. 8B, a dynamic parameter storage unit 812 is an example of the parameter storage unit 512 shown in FIG. 5 that has a capacity for only one parameter. A processing unit 801 includes the identification processing-independent calculation unit 511 and the data rewritable dynamic parameter storage unit 812 for storing an identification processing-dependent parameter. The processing unit 801 sequentially executes identification processes based on image source input data Data_in and a signal valid_in indicating that image input data is valid. The image input data is input via a data control unit 821 in a control unit 802.

The calculation unit 511 outputs a result Result/valid_out of performing pattern matching processing using the input Data_in and a parameter stored in the dynamic parameter storage unit 812. A detection unit 822 in the data control unit 821 detects the result.

If the result Result/valid_out is True, the data control unit 821 obtains a parameter necessary for the next identification processing because the next identification processing needs to be done for the current input data. In contrast, if the result is False or identification processing at the final stage ends, processing for the next input data needs to be performed from identification processing 0 at the first stage, so loading (obtainment) L(P0) of parameter 0 is executed.

As described above, when switching of identification processing (parameter loading) is necessary, the data control unit 821 issues a necessary parameter input request to a parameter obtaining unit 826 via a parameter control unit 823, and obtains a parameter from the external memory (not shown). A parameter transfer unit 825 transfers the obtained parameter to the dynamic parameter storage unit 812.

After the end of transferring the parameter to the dynamic parameter storage unit 812, a parameter switching control unit 824 notifies the calculation unit 511 of the completion of parameter switching. Then, the calculation unit 511 can execute the next identification processing.

In this fashion, the control unit 802 detects a result from the calculation unit 511, and if necessary, obtains the next necessary parameter and transfers it to the dynamic parameter storage unit 812. After the end of transfer, the control unit 802 instructs the calculation unit 511 to sequentially perform identification processes for input (rectangular) data.

The processing time when the same processing as that in 8a of FIG. 8A is executed by the arrangement of FIG. 8B will be explained with reference to 8b of FIG. 8A. Since the result of processing I0(S3_0) is False, processing is done for the next input data I1. At this time, the dynamic parameter storage unit 812 stores P3_0 used in processing I0(S3_0), and L(P0) is performed before processing I1(S0). After the end of L(P0), I1(S0) is executed. Since the result becomes True, L(P1) is done. Then, the result of processing I1(S1) becomes False, and L(0) is executed to perform processing I2(S0).

In the example of FIG. 8B, the dynamic parameter storage unit 812 can hold only one parameter, and a parameter needs to be loaded in every switching of identification processing. During parameter loading, identification processing stops.

In the example of 8b of FIG. 8A (FIG. 8B), identification processing delays by the stop time (that is, parameter loading time), compared to the case in which P0 to PN for all identification processes are stored in FIG. 6, as shown in 8a of FIG. 8A. Assume that the identification processing time is one cycle. From a comparison between 8a of FIGS. 8A and 8b of FIG. 8A, the time taken till the end of processing I5(S1) is longer by a total of eight cycles of the processing time and 20 cycles (=five times×four cycles) necessary for parameter loading.

The processing speed maximizes but even the circuit scale maximizes in the arrangement in which the internal memory stores parameters for all identification processes, like the example shown in FIG. 6. In contrast, the circuit scale minimizes but the processing speed greatly decreases in the arrangement in which the internal memory stores a parameter for one identification processing and a necessary parameter is loaded from the external memory in every identification processing, as shown in FIG. 8B. To solve these problems, a cache method and prefetch method (method of preparing the next necessary parameter in advance) are widely used as conventional techniques for speeding up processing while suppressing the circuit scale of an internal memory.

Figure 9:
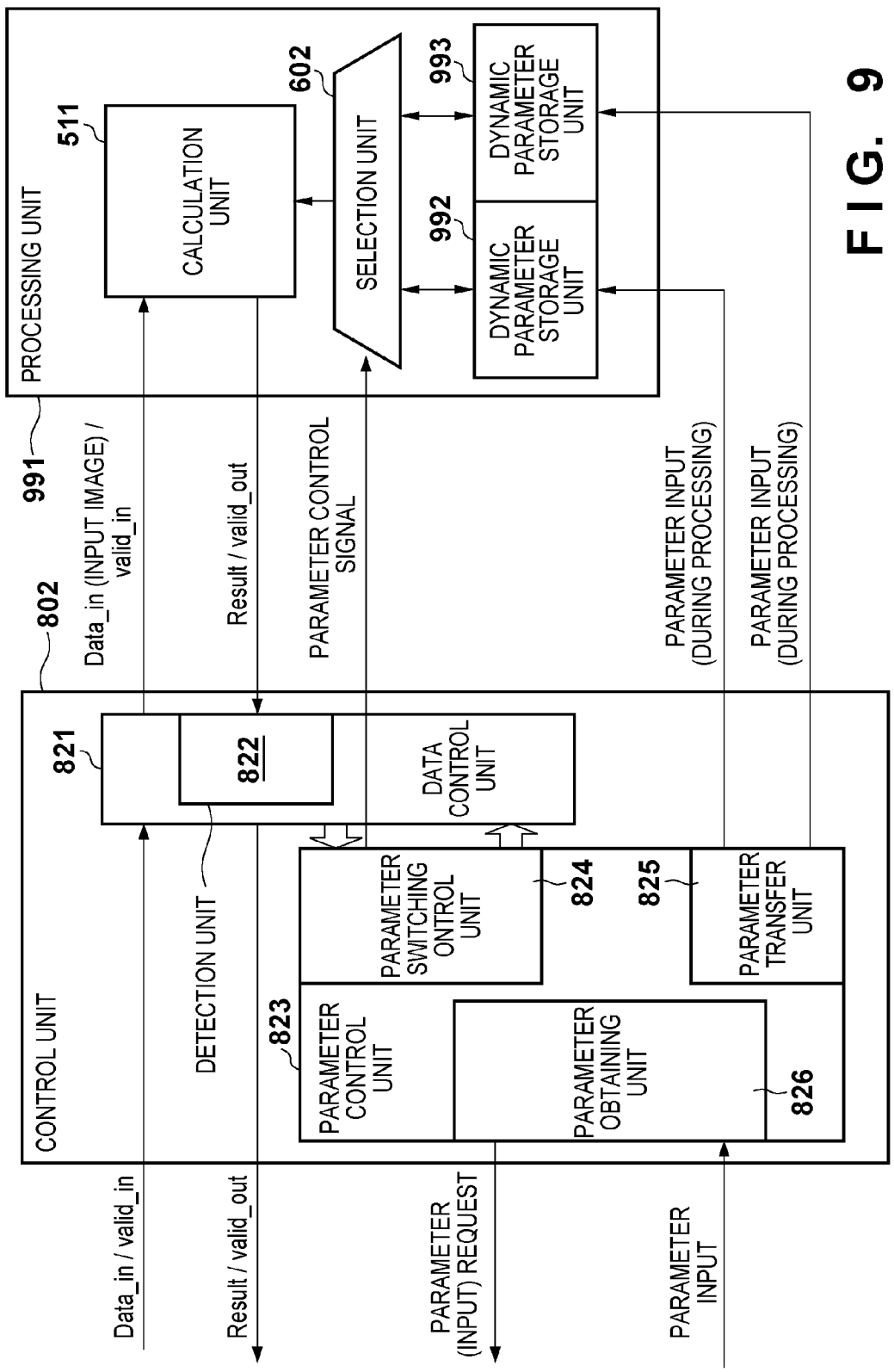
FIG. 9 is a block diagram exemplifying an arrangement including a selection unit which switches between two dynamic parameter storage units.

The cache method and prefetch method will be explained in detail. An example in FIG. 9 is an arrangement which implements the cache method and prefetch method. FIG. 9 shows an example in which two dynamic parameter storage units 992 and 993 are mounted by adding one dynamic parameter storage unit to the arrangement of FIG. 8B. In FIG. 9, the selection unit 602 is further added so that two dynamic parameters can be switched for the calculation unit 511.

Processing times in the use of the cache method in 8c of FIG. 8A and the prefetch method in 8d of FIG. 8A when the arrangement in FIG. 9 performs the same processing as that in 8a of FIG. 8A will be explained. First, the cache method will be described. In this example, data are erased from the older one.

Assume that the dynamic parameter storage unit 993 in use for processing I0(S3_0) stores P3_0, and the dynamic parameter storage unit 992 stores P2_0 used in immediately preceding processing. If the result of processing I0(S3_0) becomes False, I1(S0) is to be executed. However, the dynamic parameter storage unit 992 stores P2_0, and the dynamic parameter storage unit 993 stores P3_0. Hence, the older parameter P2_0 in the dynamic parameter storage unit 992 is erased, and L(P0) is performed. After that, I1(S0) is performed, and its result becomes True. Since the dynamic parameter storage unit 992 stores P0 and the dynamic parameter storage unit 993 stores P3_0, L(P1) is required. At this time, the older parameter P3_0 in the dynamic parameter storage unit 993 is erased, and L(P1) is performed. I1(S1) is then executed, and its result becomes False. At this time, the dynamic parameter storage units 992 and 993 store P0 and P1, respectively, so processing using P0 and P1 keeps executed without a stop. As a result of this execution, the time taken till I5(S1) becomes longer by 20 cycles than that in 8a of FIG. 8A, but shorter by eight cycles than that in 8b of FIG. 8A.

Next, the prefetch method will be explained. Also in this example, data are erased from the older one. The prefetch method executes parameter loading for the next processing without waiting for the result. When a branch destination exists, even parameters for branch destination candidates may be loaded. In this case, however, prefetch stops when branch destination selection exists.

Assume that processing I0(S3_0) has been executed by referring to P3_0 loaded in the dynamic parameter storage unit 993 and loading of P4_0 into the dynamic parameter storage unit 992 has started. The result of processing I0(S3_0) becomes False, and I1(S0) is performed next. However, at the same time as processing I0(S3_0), the prefetch method has started parameter loading L(P4_0) considered to be necessary next, as described above. Hence, processing needs to wait for L(P4_0) and L(P0). Upon completion of L(P0), I1(S0) and L(P1) start simultaneously. The result of I1(S0) becomes True, and I1(S1) is executed after waiting for the completion of already-started L(P1) for three cycles. Since branch destination selection comes next to I1(S1), no prefetch is done here. Although the result of I1(S1) becomes False, P0 and P1 have been stored by dynamic prefetch by this time, and processing continues without a stop. In branch destination selection, P2_1 is selected a result of I3(S1), and L(P2_1) is performed. Since no branch destination selection comes next, parameter loading L(P3_1) is executed as prefetch. At the same time as I3(S3_2), L(P3_2) is executed because no branch destination selection comes next. In practice, the result of I2(S2_2) becomes False, and processing waits for L(P3_2) and L(P0) to execute I4(S0). As a result of executing processing in this manner, the time taken till I5(S1) becomes longer by 23 cycles than that in 8a of FIG. 8A, but shorter by five cycles than that in 8b of FIG. 8A.

First Embodiment

The first embodiment of the present invention will be described in detail below with reference to the accompanying drawings. First, the arrangement of an information processing apparatus (data processing apparatus) which performs predetermined calculation while referring to a parameter for input data will be explained. To identify an object from an input image, the data processing apparatus performs verification between the input image and a parameter while referring to a parameter having data to identify the object. The verification processing is executed at multiple stages by a series-connected processing step group and one of processing step groups connected to the final step of the processing step group via branches.

Figure 1:
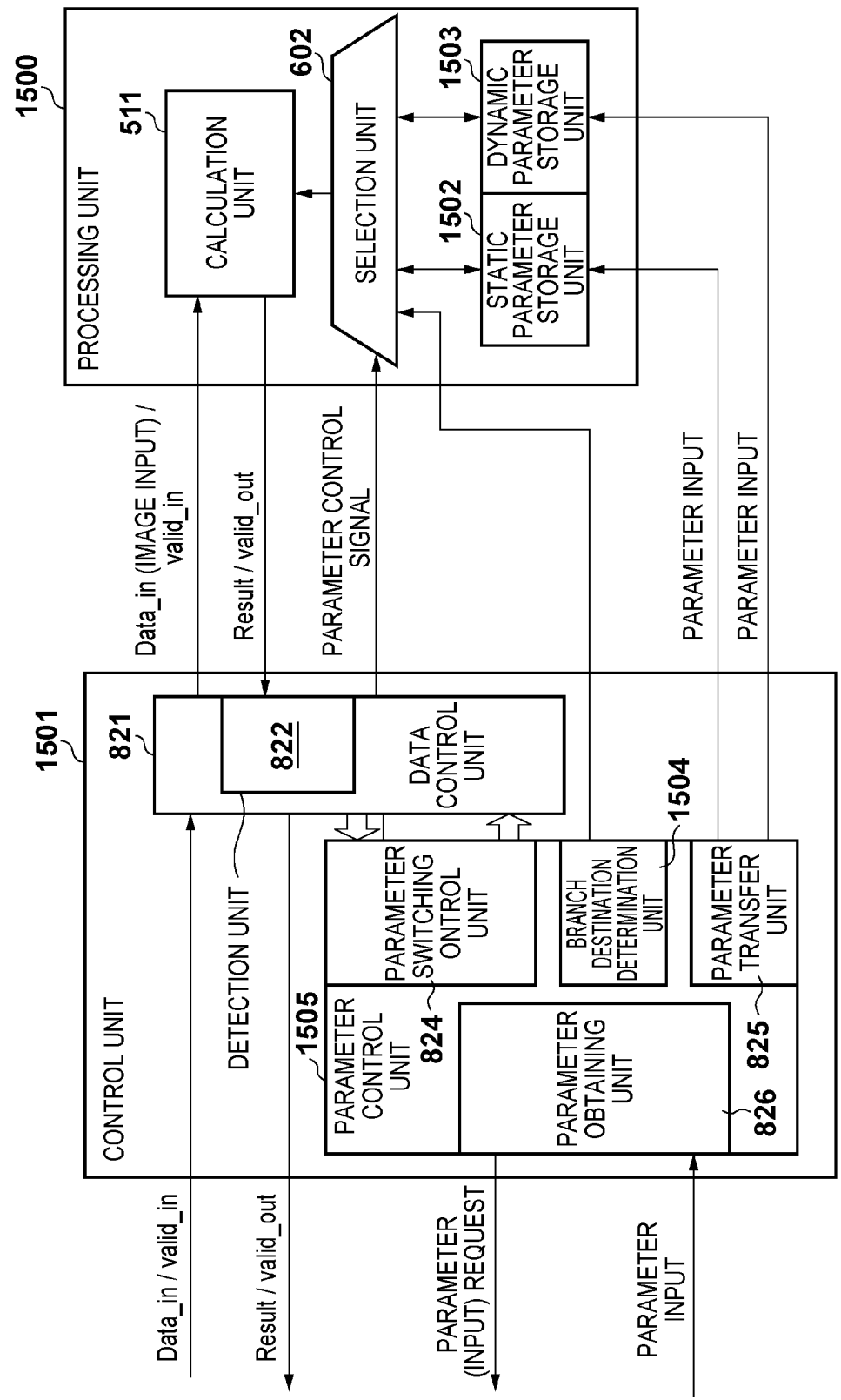
FIG. 1 is a block diagram exemplifying the arrangement of a data processing apparatus according to an embodiment.

FIG. 1 is a block diagram exemplifying the arrangement of the data processing apparatus according to the embodiment. In the arrangement of FIG. 1, a static parameter storage unit 1502 and dynamic parameter storage unit 1503 replace two dynamic parameter storage units 992 and 993 in the arrangement of a processing unit 991 in FIG. 9. The static parameter storage unit 1502 (first storage unit) stores a predetermined parameter (fixed parameter) which is fixedly referred to in processing of a calculation unit 511. The dynamic parameter storage unit 1503 (second storage unit) stores a variable parameter different from the predetermined parameter (fixed parameter) so as to be able to rewrite it.

In the example shown in FIG. 1, a branch destination determination unit 1504 is further arranged. A detection unit 822 receives the calculation result of the calculation unit 511, and transmits it to a parameter control unit 1505. Upon receiving the calculation result, the parameter control unit 1505 determines whether a parameter switching control unit 824 needs to switch the parameter. If the calculation result is True, the parameter is to be switched. In a branch structure, even if it is determined to switch the parameter, no branch destination can be determined by only the calculation result. Hence, the parameter control unit 1505 transfers the result to the branch destination determination unit 1504 to determine a branch destination. The branch destination determination unit 1504 determines a branch destination, and notifies a selection unit 602 of the determined branch destination. Upon receiving the notification from the branch destination determination unit 1504, the selection unit 602 refers to a parameter from either the static parameter storage unit 1502 or dynamic parameter storage unit 1503. The parameter referred to by the selection unit 602 is a parameter to be used for calculation in the calculation unit 511. By using the referred parameter, the calculation unit 511 performs calculation for input data. The detection unit 822 receives the calculation result and transfers it to the parameter control unit 1505. When the result is True and the processing is to branch next, the parameter control unit 1505 controls the branch destination determination unit 1504 to determine the next branch destination and notify the selection unit 602 of the determined branch destination.

A data control unit 821 detects the next necessary parameter by accepting the determination result of the branch destination determination unit 1504 and a signal indicating a calculation result output from the calculation unit 511 (discriminator) via the detection unit 822. As the detection result, the data control unit 821 outputs a parameter control signal to the selection unit 602. If a parameter stored in the static parameter storage unit 1502 needs to be referred to in accordance with the parameter control signal, the selection unit 602 refers to a static parameter stored in the static parameter storage unit 1502. Similarly, if a parameter stored in the dynamic parameter storage unit 1503 needs to be referred to in accordance with the parameter control signal, the selection unit 602 refers to a dynamic parameter stored in the dynamic parameter storage unit 1503.

A case in which the static parameter storage unit 1502 stores a plurality of parameters will be explained. When the static parameter storage unit 1502 stores a plurality of parameters, the parameter control unit 1505 stores parameter numbers stored in the static parameter storage unit 1502 and addresses (or pointers) in the static parameter storage unit 1502. The parameter number is identification information for specifying each parameter. The address (or pointer) corresponds to the parameter number, and is information for specifying a storage area where a parameter specified by the parameter number is stored, and reading out the specified parameter from the specified storage area.

When the branch destination determination unit 1504 determines to use a parameter stored in the static parameter storage unit 1502 for calculation processing, it notifies the parameter switching control unit 824 of a selected parameter number. The parameter switching control unit 824 notifies the selection unit 602 of an address or pointer corresponding to the notified parameter number. By using the notified address or pointer, the selection unit 602 refers to a parameter from the static parameter storage unit 1502. Even when a parameter stored in the dynamic parameter storage unit 1503 is to be used, the parameter switching control unit 824 notifies the selection unit 602 of an address or pointer corresponding to the notified parameter number. By using the notified address or pointer, the selection unit 602 refers to a parameter from the dynamic parameter storage unit 1503. In this fashion, the selection unit 602 refers to a parameter out of statistic and dynamic parameters in accordance with an instruction from the parameter switching control unit 824, implementing calculation using a plurality of parameters.

Next, a control unit 1501 will be described in detail. A processing unit 1500 executes identification processes sequentially for input data (rectangular image data). The rectangular image data is input to the calculation unit 511 via the data control unit 821 in the control unit 1501. The result Result/valid_out of identification processing executed by the calculation unit 511 is input to the detection unit 822 in the data control unit 821. The detection unit 822 detects the calculation result of the calculation unit 511.

The data control unit 821 notifies the parameter switching control unit 824 of the parameter control unit 1505 of the identification processing result of the calculation unit 511 that has been detected by the detection unit 822. When branch determination is necessary, the parameter switching control unit 824 controls the branch destination determination unit 1504 to determine a branch destination. The branch destination determination unit 1504 makes branch destination determination to determine a branch destination for performing identification processing next. Based on at least either of the determination result and the calculation result of the calculation unit 511, the parameter switching control unit 824 determines whether a new parameter needs to be obtained. If the parameter switching control unit 824 determines that a new parameter is necessary, it requests a parameter obtaining unit 826 to input a necessary parameter. The parameter obtaining unit 826 outputs a parameter input request to an external device (external memory).

A parameter transmitted from the external device (external memory) in response to the parameter input request is input to the parameter obtaining unit 826. The parameter obtaining unit 826 obtains the parameter, and transfers the obtained parameter to the dynamic parameter storage unit 1503 using a parameter transfer unit 825. After the end of transferring the parameter, the data control unit 821 of the parameter control unit 1505 instructs the selection unit 602 to output a parameter control signal. In response to this, the selection unit 602 switches to be able to set (refer to), in the calculation unit 511, the parameter just transferred to the dynamic parameter storage unit 1503.

As described above, the control unit 1501 detects the result of identification processing from the calculation unit 511, and if necessary, obtains the next necessary parameter and transfers it to the dynamic parameter storage unit 1503. After the end of transfer, the selection unit 602 is instructed about the parameter. Identification processing can be performed for input rectangular image data.

Figure 10:
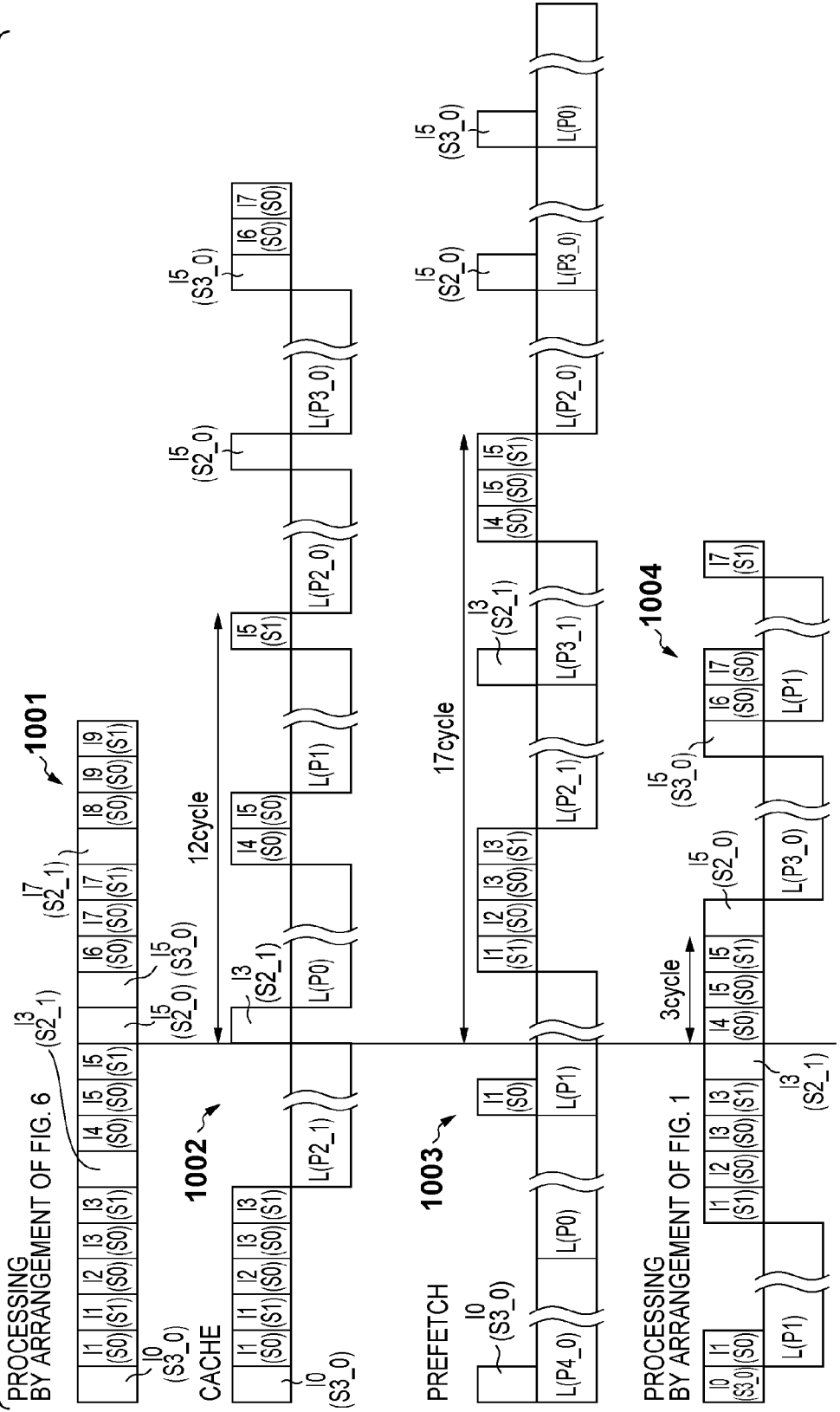
FIG. 10 is an exemplary view for explaining the data processing time in the arrangement of FIG. 1.

The processing time in the arrangement shown in FIG. 1 will be described with reference to FIG. 10 in comparison with FIGS. 8A to 8B. A timing chart 1004 in FIG. 10 represents the data processing time in the arrangement described with reference to FIG. 1. In this example, the static parameter storage unit 1502 stores three parameters P0, P2_0, and P2_1 corresponding to the sequence of processing 700 in FIG. 7B.

Assume that the dynamic parameter storage unit 1503 stores P3_0 to perform processing I0(S3_0), and the static parameter storage unit 1502 stores P0, P2_0, and P2_1, as described above. The result of processing I0(S3_0) becomes False, and I1(S0) is performed. Since the static parameter storage unit 1502 has stored P0, processing starts instantaneously. Thereafter, the result of I1(S0) becomes True, and L(P1) starts. At this time, the dynamic parameter storage unit 1503 stores P1. Then, the result of I1(S1) becomes False. While processing continues up to I5(S1), no processing with loading of parameters stop because only P1 in the dynamic parameter storage unit 1503 and P0, P2_0, and P2_1 stored in the static parameter storage unit 1502 are referred to. The result of I5(S2_0) becomes True, and L(P3_0) is done. At this time, P1 held in the dynamic parameter storage unit 1503 is deleted, and P3_0 is loaded. As a result of executing processing in this way, the time taken till processing I5(S1) becomes longer by three cycles than that in a timing chart 1001 of FIG. 10.

In 8c and 8d in FIG. 8A, the dynamic parameter storage units 992 and 993 have been exemplified. That is, only two parameters can be held. However, an arrangement capable of holding four parameters in the dynamic parameter storage units 992 and 993 will be exemplified to compare processing times in the cache method and prefetch method with a processing time in the arrangement of the embodiment in FIG. 10. As a result of executing the same processing in the cache method (a timing chart 1002) of FIG. 10, the time taken till processing I5(S1) becomes longer by 12 cycles than that in the timing chart 1001 of FIG. 10. As a result of executing the same processing in the prefetch method (a timing chart 1003) of FIG. 10, the time taken till processing I5(S1) becomes longer by 17 cycles than that in the timing chart 1001 of FIG. 10. The timing chart 1004 of the embodiment can speed up processing by nine cycles compared to the timing chart 1002, and 14 cycles compared to the timing chart 1003.

Second Embodiment

Figure 11:
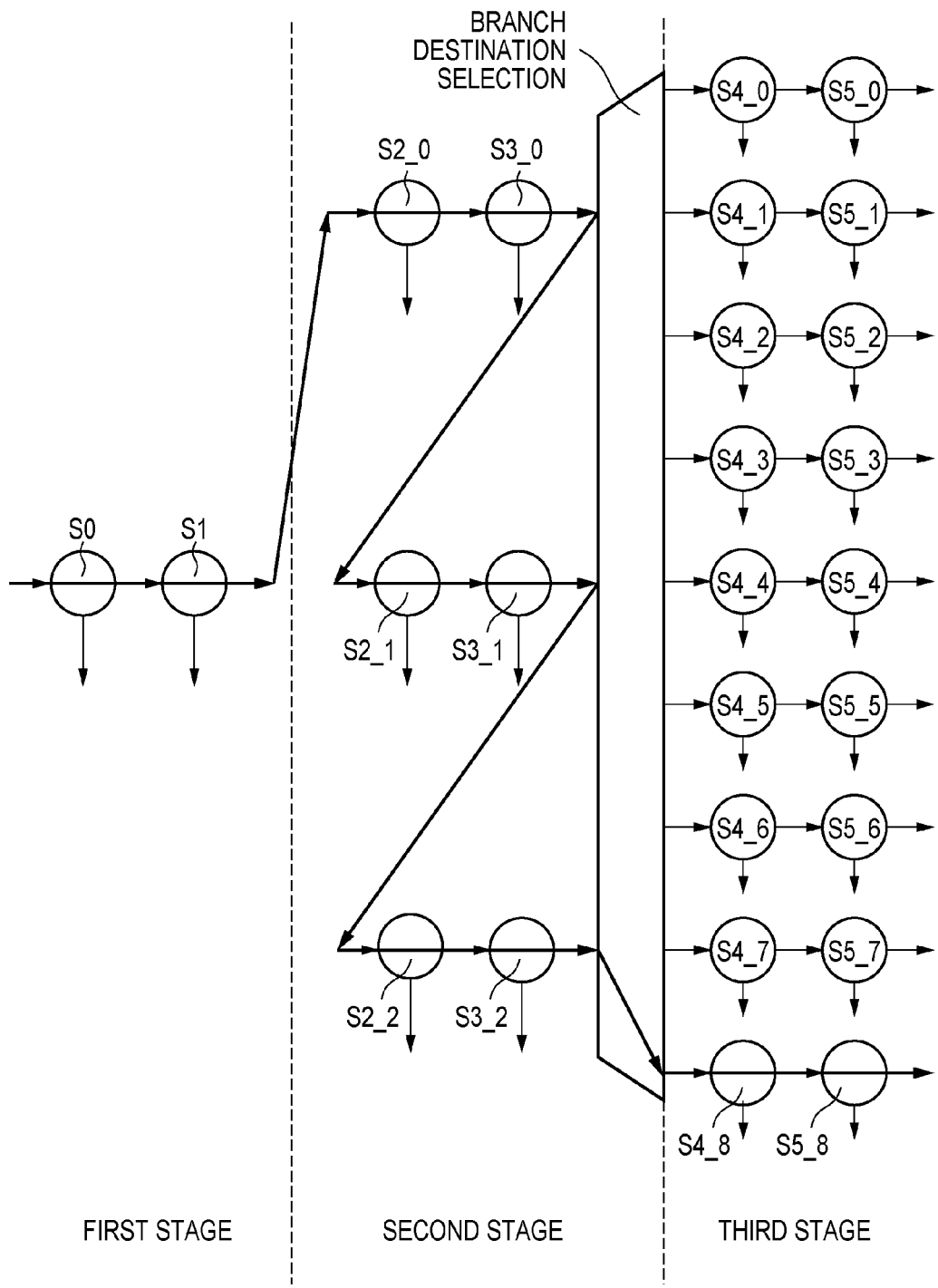
FIG. 11 is a view showing a processing sequence in the second embodiment.

The second embodiment of the present invention will be described with reference to FIGS. 1 and 11. In this sequence, unlike FIGS. 7A and 7B, after processing continues up to the first and second stages, a branch destination is selected to determine the next branch of identification processing 4. The processing sequence of the second embodiment shown in FIG. 11 will be explained with reference to FIG. 1.

First, P4_0 to P4_8 and P0 which may be selected after branch determination are loaded into a static parameter storage unit 1502 before the start of processing. At this time, a parameter obtaining unit 826 outputs a request to an external device (external memory) which manages parameters, to input parameter P1 which will be necessary in a dynamic parameter storage unit 1503 when the result of processing S0 becomes True. When the parameter obtaining unit 826 receives the parameter transmitted from the external device (external memory), a parameter transfer unit 825 transfers the parameter to the dynamic parameter storage unit 1503, and the dynamic parameter storage unit 1503 stores it. A processing unit 1500 waits for input data parallelly to the parameter obtainment. Upon receiving input data, a calculation unit 511 performs I0(S0). At this time, a parameter control unit 1505 outputs a parameter control signal to a selection unit 602. The parameter control signal contains an instruction to refer to P0 in the static parameter storage unit 1502. The selection unit 602 refers to P0 in the static parameter storage unit 1502, and sets parameter P0 in the calculation unit 511. By using the set parameter P0, the calculation unit 511 performs I0(S0). The identification result of I0(S0) becomes True, and the identification result is output to a detection unit 822 in a data control unit 821. Since the result of identification processing 0 becomes True, the data control unit 821 instructs the parameter control unit 1505 to execute the next identification processing 1 by the calculation unit 511. Upon receiving the instruction, the parameter control unit 1505 checks whether P1 for identification processing 1 has been stored in the static parameter storage unit 1502 or dynamic parameter storage unit 1503. In this case, P1 has been stored first in the dynamic parameter storage unit 1503. Thus, the parameter control unit 1505 outputs a parameter control signal to the selection unit 602 to instruct it to refer to P1 in the dynamic parameter storage unit 1503. The selection unit 602 refers to parameter P1 and sets it in the calculation unit 511. By referring to the set parameter P1, the calculation unit 511 executes processing I0(S1).

When the dynamic parameter storage unit 1503 can store two or more parameters, parameter loading L(P2) for the next identification processing 2 is executed. At this time, the parameter control unit 1505 uses the parameter obtaining unit 826 to issue an L(P2) request. When data is input from the external memory, the parameter transfer unit 825 stores it in the dynamic parameter storage unit 1503. In this manner, the prefetch operation can be achieved by estimating the next necessary parameter from a currently processed one. The processing proceeds similarly, and when the result of I0(S3_2) becomes True, a branch destination is selected. Since the parameter to be used for the branch destination has already been stored in the static parameter storage unit 1502 for any determined branch destination, identification processing can start quickly.

In the first and second embodiments, the static parameter storage unit 1502 and dynamic parameter storage unit 1503 are described explicitly separately. However, the area of a single parameter storage unit may be divided. As for data to the static parameter storage unit 1502, a parameter may be stored in the ROM (Read Only Memory) or the like as long as the identification target is determined in implementation.

In contrast, when there are a plurality of identification targets such as a face, person, and car in implementation, or when the parameter is changed in accordance with a mode such as the profile, upper body, or head, parameters corresponding to the plurality of identification targets are stored in the static parameter storage unit 1502 before the start of processing. The present invention can therefore cope with a plurality of targets and modes. The present invention may be applied to a system including a plurality of devices (for example, a host computer, interface device, reader, and printer) or an apparatus (for example, a copying machine or facsimile apparatus) formed by a single device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-187641, filed Aug. 24, 2010, which is hereby incorporated by reference herein in its entirety.

What is claimed is:

1. An information processing apparatus which performs, at multiple stages by a series-connected processing step group and one processing step group out of a plurality of processing step groups connected to a final step of the processing step group via branches, verification processing between an input image and a parameter while referring to the parameter having data to identify an object in the input image, comprising:
   a first storage unit configured to store a predetermined fixed parameter;
   a second storage unit configured to store a variable parameter different from the fixed parameter to be able to rewrite the variable parameter;
   a calculation unit configured to perform verification processing to identify the object from the input image by referring to one of the fixed parameter and the variable parameter in one of the series-connected processing step group and one processing step group out of the plurality of processing step groups;
   a determination unit configured to determine, based on a calculation result of said calculation unit, whether said calculation unit executes the verification processing next in the series-connected processing step group or one processing step group out of the plurality of processing step groups connected via the branches; and
   a selection unit configured to select, based on a determination result of said determination unit and the calculation result of said calculation unit, one of the fixed parameter and the variable parameter to be referred to next by said calculation unit,
   wherein at least one processor functions as at least one of the units.

2. The apparatus according to claim 1, wherein when executing the verification processing by one processing step group out of the plurality of processing step groups connected via the branches, said determination unit determines a branch destination at which the verification processing is to be executed.

3. The apparatus according to claim 1, further comprising:
   an obtaining unit configured to, when a new variable parameter needs to be obtained in verification processing to be executed next by said calculation unit in accordance with at least one of the determination result of said determination unit and the calculation result of said calculation unit, obtain the new variable parameter from an external device; and
   a transfer unit configured to transfer the new variable parameter obtained by said obtaining unit to said second storage unit.

4. The apparatus according to claim 1, wherein said first storage unit stores, as the fixed parameter, a parameter used for verification processing to be executed first in each of the plurality of processing step groups connected via the branches.

5. An information processing method in which, at multiple stages by a series-connected processing step group and one processing step group out of a plurality of processing step groups connected to a final step of the processing step group via branches, verification processing is performed between an input image and a parameter while referring to the parameter having data to identify an object in the input image, comprising:
   using at least one processor to perform at least one of the steps of:
   a first storage step of storing a predetermined fixed parameter;
   a second storage step of storing a variable parameter different from the fixed parameter to be able to rewrite the variable parameter;
   a calculation step of performing verification processing to identify the object from the input image by referring to one of the fixed parameter and the variable parameter in one of the series-connected processing step group and one processing step group out of the plurality of processing step groups;
   a determination step of determining, based on a calculation result of the calculation step, whether the calculation step executes the verification processing next in the series-connected processing step group or one processing step group out of the plurality of processing step groups connected via the branches; and
   a selection step of selecting, based on a determination result of the determination step and the calculation result of the calculation step, one of the fixed parameter and the variable parameter to be referred to next in the calculation step.

6. A non-transitory storage medium storing a program for causing a computer to execute an information processing method defined in claim 5.

* * * * *